United States Patent
Yamamoto (10) Patent No.: US 10,142,796 B2
(45) Date of Patent: Nov. 27, 2018

(54) MANAGEMENT DEVICE, MANAGEMENT SYSTEM, MANAGEMENT METHOD, AND MANAGEMENT PROGRAM

(71) Applicant: SUMITOMO ELECTRIC INDUSTRIES, LTD., Osaka-shi, Osaka (JP)

(72) Inventor: Hirotsugu Yamamoto, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 176 days.

(21) Appl. No.: 15/105,022

(22) PCT Filed: May 7, 2015

(86) PCT No.: PCT/JP2015/063193
§ 371 (c)(1),
(2) Date: Jun. 16, 2016

(87) PCT Pub. No.: WO2015/174319
PCT Pub. Date: Nov. 19, 2015

(65) Prior Publication Data
US 2017/0006435 A1    Jan. 5, 2017

(30) Foreign Application Priority Data

May 16, 2014 (JP) ................ 2014-101887

(51) Int. Cl.
*H04W 4/04* (2009.01)
*H04W 4/70* (2018.01)
(Continued)

(52) U.S. Cl.
CPC ............. *H04W 4/04* (2013.01); *G06F 13/00* (2013.01); *H04L 43/08* (2013.01); *H04L 67/12* (2013.01);
(Continued)

(58) Field of Classification Search
CPC ..... H04L 41/0893; H04L 43/08; H04L 67/12; H04W 4/005; H04W 4/006; H04W 4/04; H04W 4/08
See application file for complete search history.

(56) References Cited

U.S. PATENT DOCUMENTS

| | | | |
|---|---|---|---|
| 9,693,244 B2 * | 6/2017 | Maruhashi | H04L 12/403 |
| 2009/0210075 A1 | 8/2009 | Moriwaki | |
| 2011/0145578 A1 * | 6/2011 | Asano | H04L 9/0866 |
| | | | 713/169 |

FOREIGN PATENT DOCUMENTS

| | | |
|---|---|---|
| JP | 4237134 B2 | 3/2009 |
| JP | 2009-123044 A | 6/2009 |

(Continued)

*Primary Examiner* — Mewale Ambaye
(74) *Attorney, Agent, or Firm* — Drinker Biddle & Reath LLP (57) ABSTRACT

In a management system which allows measurement results obtained by sensors to be collected and a management target to be managed on the basis of the collected measurement results, a management device and the like that can provide more useful information for managing the management target are provided. The management device includes: an obtainment unit configured to obtain, from each of a plurality of sensors each configured to perform measurement regarding a management target, sensor information indicating a result of the measurement and identification information of the sensor; and a group management unit configured to perform a grouping process of dividing a plurality of the sensors into a plurality of groups by using the pieces of the identification information obtained by the obtainment unit, and to perform a process of storing group information indicating a result of the grouping process.

7 Claims, 8 Drawing Sheets

(51) Int. Cl.
| | |
|---|---|
| *H04W 4/38* | (2018.01) |
| *G06F 13/00* | (2006.01) |
| *H04Q 9/00* | (2006.01) |
| *H04W 4/08* | (2009.01) |
| *H04L 12/26* | (2006.01) |
| *H04L 29/08* | (2006.01) |
| *H04L 12/24* | (2006.01) |

(52) U.S. Cl.
CPC ................ *H04Q 9/00* (2013.01); *H04W 4/08* (2013.01); *H04W 4/38* (2018.02); *H04W 4/70* (2018.02); *H04L 41/0893* (2013.01)

(56) References Cited

FOREIGN PATENT DOCUMENTS

| JP | 2011-154045 A | 8/2011 |
|---|---|---|
| JP | 2014-074509 A | 4/2014 |
| WO | WO 2006/090480 A | 8/2006 |

\* cited by examiner

MANAGEMENT DEVICE, MANAGEMENT SYSTEM, MANAGEMENT METHOD, AND MANAGEMENT PROGRAM

TECHNICAL FIELD

The present invention relates to a management device, a management system, a management method, and a management program, and in particular, relates to a management device, a management system, a management method, and a management program for managing information indicating a measurement result regarding a management target.

BACKGROUND ART

Communication services have been provided that use wireless base station devices each forming a cell which is an area where wireless terminal devices are allowed to perform communication. As a system utilizing such a communication service, an M2M (machine to machine) system is known. In the M2M system, for example, apparatuses each having a wireless device installed therein transmit/receive information to/from each other not via manual operation, whereby the apparatuses are automatically controlled.

As one example of the M2M system, for example, PATENT LITERATURE 1 (Japanese Patent No. 4237134) discloses the following technology. That is, disclosed is a network system in which a mobile communication network which includes: a wireless terminal; gateway nodes which are wirelessly communicable with the wireless terminal; and a positional information storage device which holds positional information of the wireless terminal is connected via a gateway to another network to which a terminal being a destination to which a message is transmitted from the wireless terminal is connected. The network system has terminal address holding means which holds the address of the terminal being the transmission destination which has been determined in advance for each wireless terminal. In a case where a message is to be transmitted from a wireless terminal to the aforementioned terminal, if a gateway node receives a wireless frame from the wireless terminal, the gateway node accesses the terminal address holding means, and identifies the terminal address of the message transmission destination for the wireless terminal, and transmits the message via the gateway to the terminal of the identified transmission destination. In a case where a message is to be transmitted from the aforementioned terminal to the wireless terminal, the gateway accesses the positional information storage device, obtains positional information from the ID of the wireless terminal, and transfers the message to the corresponding gateway node on the basis of the obtained positional information. The gateway node transfers the message to the wireless terminal.

CITATION LIST

Patent Literature

PATENT LITERATURE 1: Japanese Patent No. 4237134

SUMMARY OF INVENTION

Technical Problem

As one mode of utilizing such an M2M system, a management system is conceivable in which: one or a plurality of communication slave devices are provided that can each wirelessly transmit a measurement result regarding a management target; measurement results obtained by sensors are collected at a base station via the communication slave devices; and the management target is managed on the basis of the collected measurement results.

In such a management system, there is a demand for a technology that provides more useful information for managing the management target.

The present invention has been made in order to solve the above problem. An object of the present invention is to provide a management device, a management system, a management method, and a management program which are capable of providing more useful information for managing a management target, in a management system which allows measurement results obtained by the sensors to be collected and the management target to be managed on the basis of the collected measurement results.

Solution to Problem (1) In order to solve the above problem, a management device according to an aspect of the present invention includes: an obtainment unit configured to obtain, from each of a plurality of sensors each configured to perform measurement regarding a management target, sensor information indicating a result of the measurement and identification information of the sensor; and a group management unit configured to perform a grouping process of dividing a plurality of the sensors into a plurality of groups by using the pieces of the identification information obtained by the obtainment unit, and to perform a process of storing group information indicating a result of the grouping process.

(6) In order to solve the above problem, a management system according to an aspect of the present invention includes: a plurality of sensors each configured to perform measurement regarding a management target and to transmit sensor information indicating a result of the measurement and identification information of the sensor; and a management device configured to receive the sensor information and the identification information transmitted from each of the plurality of the sensors, to perform a grouping process of dividing a plurality of the sensors into a plurality of groups by using the received pieces of the identification information, and to perform a process of storing group information indicating a result of the grouping process.

(7) In order to solve the above problem, a management method according to an aspect of the present invention is a management method to be performed in a management device, the management method including the steps of: obtaining, from each of a plurality of sensors each configured to perform measurement regarding a management target, sensor information indicating a result of the measurement and identification information of the sensor; performing a grouping process of dividing a plurality of the sensors into a plurality of groups by using the obtained pieces of the identification information; and performing a process of storing group information indicating a result of the grouping process.

(8) In order to solve the above problem, a management method according to another aspect of the present invention is a management method to be performed in a management system, the management method including the steps of: a plurality of sensors each performing measurement regarding a management target and transmitting sensor information indicating a result of the measurement and identification information of the sensor; a management device receiving the sensor information and the identification information transmitted from each of the plurality of the sensors; the management device performing a grouping process of dividing a plurality of the sensors into a plurality of groups by using the received pieces of the identification information; and the management device performing a process of storing group information indicating a result of the grouping process.

(9) In order to solve the above problem, a management program according to an aspect of the present invention is a management program to be used in a management device, the management program causing a computer to execute the steps of: obtaining, from each of a plurality of sensors each configured to perform measurement regarding a management target, sensor information indicating a result of the measurement and identification information of the sensor; performing a grouping process of dividing a plurality of the sensors into a plurality of groups by using the obtained pieces of the identification information; and performing a process of storing group information indicating a result of the grouping process.

(10) In order to solve the above problem, a management program according to another aspect of the present invention is a management program to be used in a management system, the management program causing a computer to execute the steps of: a plurality of sensors each performing measurement regarding a management target and transmitting sensor information indicating a result of the measurement and identification information of the sensor; a management device receiving the sensor information and the identification information transmitted from each of the plurality of the sensors; the management device performing a grouping process of dividing a plurality of the sensors into a plurality of groups by using the received pieces of the identification information; and the management device performing a process of storing group information indicating a result of the grouping process.

The present invention can not only be realized as a management device provided with such a characteristic processing unit, but can also be realized as a semiconductor integrated circuit that realizes a part or the entirety of the management device.

In addition, the present invention can not only be realized as a management system provided with such a characteristic processing unit, but can also be realized as a semiconductor integrated circuit that realizes a part or the entirety of the management system.

Advantageous Effects of Invention

According to the present invention, in a management system which allows measurement results obtained by the sensors to be collected and the management target to be managed on the basis of the collected measurement results, more useful information for managing the management target can be provided.

DESCRIPTION OF EMBODIMENTS

First, the contents of embodiments of the present invention will be listed and described.

(1) A management device according to an embodiment of the present invention includes: an obtainment unit configured to obtain, from each of a plurality of sensors each configured to perform measurement regarding a management target, sensor information indicating a result of the measurement and identification information of the sensor; and a group management unit configured to perform a grouping process of dividing a plurality of the sensors into a plurality of groups by using the pieces of the identification information obtained by the obtainment unit, and to perform a process of storing group information indicating a result of the grouping process.

Here, "group information" indicating a result of the grouping process means information that indicates which identification information belongs to which group, such as information that defines the correspondence between the names of the groups into which the sensors have been divided and the identification information of the sensors, for example.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of the sensors are divided into groups by dividing the channels that are used in communication of sensor information. However, in this case, the base stations for relaying communication between the sensors and the management device have to be installed by the number of channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

(2) Preferably, the management device further includes a display unit configured to display on a screen the identification information of each sensor, wherein the group management unit receives an operation performed by a user and for associating pieces of the identification information, displayed by the display unit, with one another, and performs the grouping process on the basis of the operation.

According to this configuration, it is possible to divide a plurality of sensors into groups, by the user performing an operation by use of a mouse, a touch panel, or the like onto the identification information displayed on the screen, for example. Accordingly, it is possible to divide the sensors into groups through a simple operation, and it is also possible to change the content of the grouping through a simple operation.

(3) Preferably, the management device further includes an information creation unit configured to, with respect to target groups being at least a part of the plurality of the groups, create management information for managing the management target, on the basis of the sensor information for each target group.

According to this configuration, by confirming the management information for each target group, it is possible to properly grasp the state of each target group, and to compare the states among a plurality of target groups. Accordingly, the management target can be more appropriately managed.

(4) Preferably, the management device further includes an operation control unit configured to, with respect to target groups being at least a part of the plurality of the groups, control operation of each sensor for each target group.

According to this configuration, since the operation of a plurality of the sensors that belong to the same target group can be comprehensively controlled, efficient control can be realized.

(5) More preferably, the operation control unit controls, for each target group, a transmission cycle of the sensor information from the sensor.

According to this configuration, in a case where the quality of communication from a plurality of the sensors that belong to a certain target group is not sufficient, for example, it is possible to take appropriate measures in accordance with the communication state and the like for each target group, such as performing comprehensive control so that the transmission cycle of sensor information from each of the sensors that belong to the target group is shortened.

(6) A management system according to an embodiment of the present invention includes: a plurality of sensors each configured to perform measurement regarding a management target and to transmit sensor information indicating a result of the measurement and identification information of the sensor; and a management device configured to receive the sensor information and the identification information transmitted from each of the plurality of the sensors, to perform a grouping process of dividing a plurality of the sensors into a plurality of groups by using the received pieces of the identification information, and to perform a process of storing group information indicating a result of the grouping process.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of sensors are divided into groups by dividing the channels that are used in communication of sensor information. However, in this case, the base stations for relaying communication between the sensors and the management device have to be installed by the number of the channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

(7) A management method according to an embodiment of the present invention is a management method to be performed in a management device, the management method including the steps of: obtaining, from each of a plurality of sensors each configured to perform measurement regarding a management target, sensor information indicating a result of the measurement and identification information of the sensor; performing a grouping process of dividing a plurality of the sensors into a plurality of groups by using the obtained pieces of the identification information; and performing a process of storing group information indicating a result of the grouping process.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of sensors are divided into groups by dividing the channels that are used in communication of sensor information. However, in this case, the base stations for relaying communication between the sensors and the management device have to be installed by the number of the channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

(8) A management method according to an embodiment of the present invention is a management method to be performed in a management system, the management method including the steps of: a plurality of sensors each performing measurement regarding a management target and transmitting sensor information indicating a result of the measurement and identification information of the sensor; a management device receiving the sensor information and the identification information transmitted from each of the plurality of the sensors; the management device performing a grouping process of dividing a plurality of the sensors into a plurality of groups by using the received pieces of the identification information; and the management device performing a process of storing group information indicating a result of the grouping process.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of sensors are divided into groups by dividing the channels that are used in communication of sensor information. However, in this case, the base stations for relaying communication between the sensors and the management device have to be installed by the number of the channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

(9) A management program according to an embodiment of the present invention is a management program to be used in a management device, the management program causing a computer to execute the steps of: obtaining, from each of a plurality of sensors each configured to perform measurement regarding a management target, sensor information indicating a result of the measurement and identification information of the sensor; performing a grouping process of dividing a plurality of the sensors into a plurality of groups by using the obtained pieces of the identification information; and performing a process of storing group information indicating a result of the grouping process.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of sensors are divided into groups by dividing the channels that are used in communication of sensor information. However, in this case, the base stations for relaying communication between the sensors and the management device have to be installed by the number of the channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

(10) A management program according to an embodiment of the present invention is a management program to be used in a management system, the management program causing a computer to execute the steps of: a plurality of sensors each performing measurement regarding a management target and transmitting sensor information indicating a result of the measurement and identification information of the sensor; a management device receiving the sensor information and the identification information transmitted from each of the plurality of the sensors; the management device performing a grouping process of dividing a plurality of the sensors into a plurality of groups by using the received pieces of the identification information; and the management device performing a process of storing group information indicating a result of the grouping process.

Thus, by dividing a plurality of the sensors into groups, it becomes possible to provide new information that has not been able to be provided on the basis of sensor-by-sensor analysis, such as, for example, a collection of a plurality of pieces of sensor information for each group, and a comparison result of sensor information between groups. Therefore, in the management system which allows measurement results obtained by the sensors to be collected and the management target to be managed on the basis of the collected measurement results, it is possible to provide more useful information for managing the management target.

Meanwhile, for example, it is conceivable that a plurality of sensors are divided into groups by dividing the channels that are used in communication of sensor information. However, in this case, the base stations for relaying communication between the sensors and the management device have to be installed by the number of the channels, which requires a large number of devices. In contrast, by dividing a plurality of sensors into groups by using identification information of each sensor as described above, it is possible to divide the sensors into groups while transmitting the sensor information from each sensor to the management device via one base station. Thus, it is not necessary to provide a large number of devices.

Hereinafter, embodiments of the present invention will be described with reference to the drawings. In the drawings, the same or corresponding parts are denoted by the same reference signs, and description thereof is not repeated. At least some parts of the embodiments described below can be combined together as desired.

First Embodiment

[Configuration and Basic Operation]
(Configuration of Management System)

Figure 1:
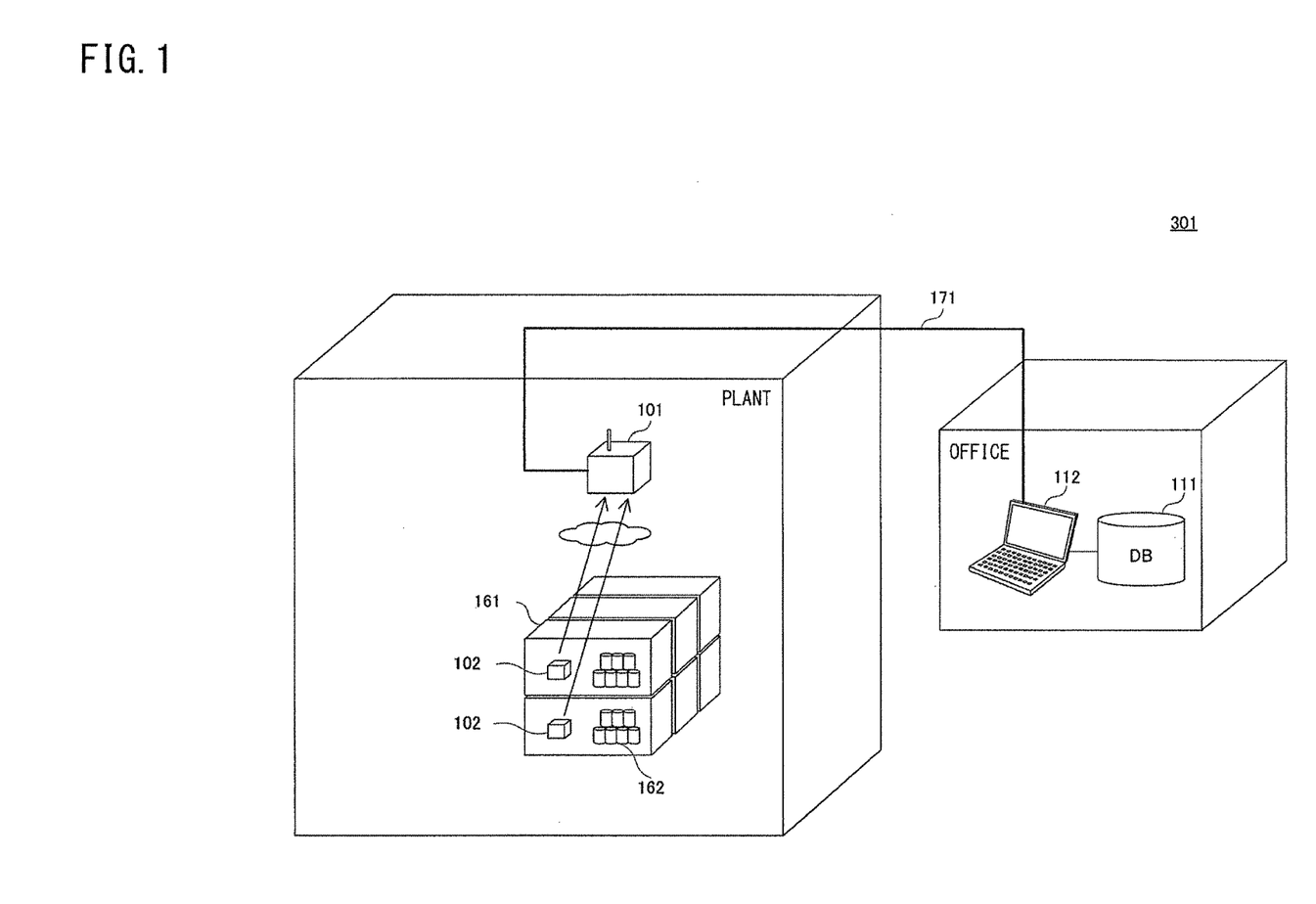
FIG. 1 shows a configuration of a management system according to a first embodiment of the present invention.

FIG. 1 shows a configuration of a management system according to a first embodiment of the present invention.

With reference to FIG. 1, a management system 301 includes: a base station 101; one or a plurality of communication slave devices 102, an accumulation device 111; and a management device 112.

The management system 301 is installed in, for example, a plant and an office of a business entity. For example, the management system 301 manages the temperature and the humidity of industrial materials 162 in the plant. In this example, the base station 101 and each communication slave device 102 are provided in a plant, and the accumulation device 111 and the management device 112 are provided in an office.

Each communication slave device 102 includes one or a plurality of sensors, and each sensor performs measurement regarding a management target, e.g., the industrial materials 162 stored in the plant. The communication slave device 102 transmits to the base station 101 a wireless signal that contains sensor information indicating a measurement result obtained by each sensor of the communication slave device 102. More specifically, each sensor of the communication slave device 102 is provided in a container 161 in the plant, and measures the temperature, the humidity, or the like of the industrial materials 162 in the container 161.

FIG. 1 shows one exemplary case in which: a plurality of containers 161 are provided in the plant; and communication slave devices 102 are installed in their corresponding containers 161, respectively. It should be noted that each communication slave device 102 may not be configured to transmit the wireless signal that contains sensor information to the base station 101. Instead, some or all of the plurality of communication slave devices 102 may be configured to transmit sensor information to the base station 101 through wired communication.

The base station 101 receives a wireless signal from each communication slave device 102, and transmits sensor information and the like contained in the received wireless signal to the management device 112 via a network 171 such as Ethernet (registered trade mark) or a wireless LAN (local area network). For example, the base station 101 adds time information such as a time stamp, link quality indication (LQI), and the like to the sensor information and transmits the resultant sensor information to the management device 112. Here, a greater value of the LQI indicates a better link quality, for example. The management system 301 may be provided with a plurality of the base stations 101.

The management device 112 is a server or a PC (personal computer), for example, and receives the sensor information transmitted from the base station 101 and transmits the received sensor information and the like to the accumulation device 111.

The accumulation device 111 accumulates the sensor information and the like received from the management device 112. For example, the sensor information is put into a data base to be accumulated in the accumulation device 111. The accumulation device 111 may be a part of the management device 112.

In addition, on the basis of the sensor information and the like accumulated in the accumulation device 111, the management device 112 creates management information for managing the industrial materials 162 being the management target. Then, the management device 112 displays the created management information on its own screen, for example.

It should be noted that the management information may be data obtained by subjecting the sensor information to some calculation and the like, or may be data that has the same content of a part or the entirety of the sensor information. Further, the management information may include information of a type different from the type of the sensor information.

(Configuration of Communication Slave Device)

Figure 2:
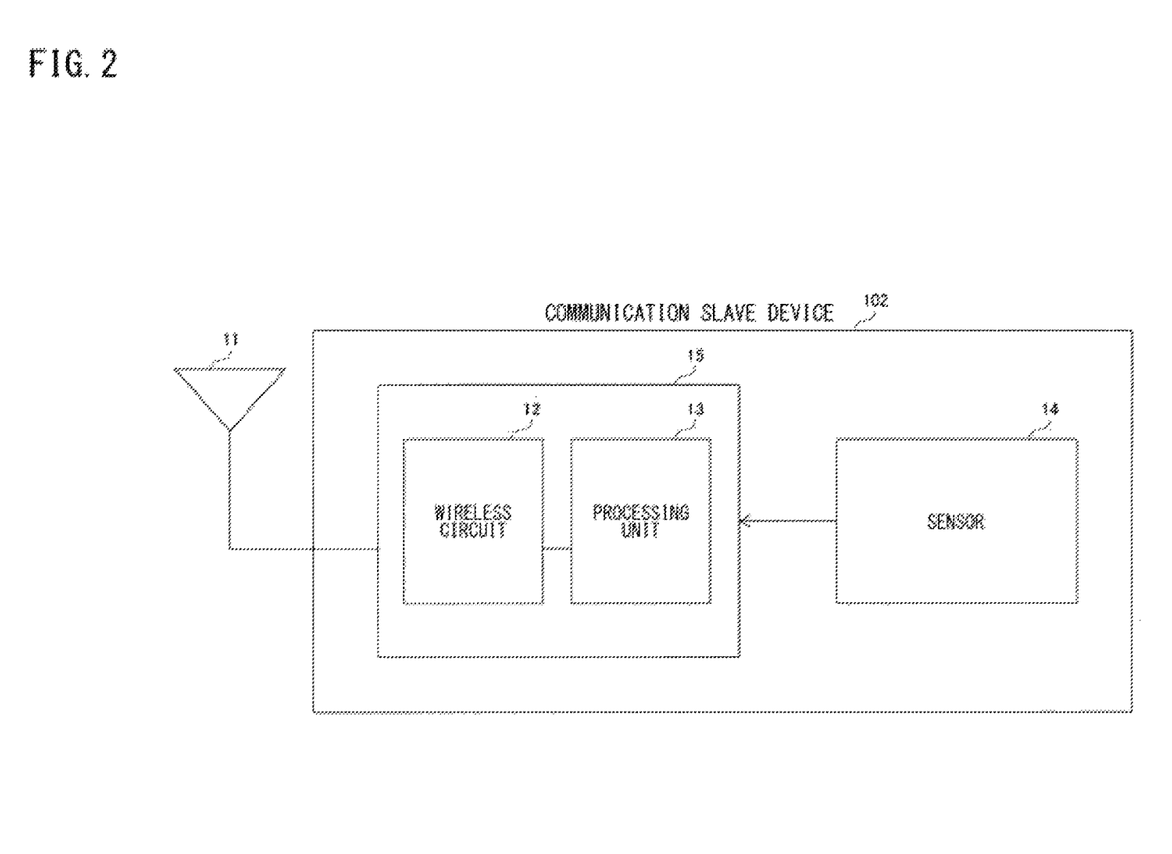
FIG. 2 shows a configuration of a communication slave device in the management system according to the first embodiment of the present invention.

FIG. 2 shows a configuration of a communication slave device in the management system according to the first embodiment of the present invention.

With reference to FIG. 2, the communication slave device 102 includes an antenna 11, a wireless circuit 12, a processing unit 13, and a sensor 14. The processing unit 13 is realized by a CPU (central processing unit), for example. For example, the wireless circuit 12 and the processing unit 13 are included in one semiconductor integrated circuit 15.

The sensor 14 measures the temperature or humidity around the sensor 14, for example, and outputs sensor information indicating the measured temperature or humidity, to the processing unit 13 via a I2C bus (registered trade mark), for example. It should be noted that the sensor 14 may perform measurement of any kind from among, for example, atmospheric pressure, acceleration, angle, angular velocity, magnetic force, illuminance, voltage, current, carbon dioxide concentration, and carbon monoxide gas concentration, other than temperature and humidity. Furthermore, the communication slave device 102 may include a plurality of the sensors 14, and the plurality of the sensors 14 may perform measurements of types different from one another.

The processing unit 13 causes the sensor information received from the sensor 14 to be included in a packet of a frame format in accordance with the IEEE802.15.4 standard, for example, and outputs the packet to the wireless circuit 12. Further, the processing unit 13 causes the packet to include the ID (Identification) (hereinafter, referred to as "sensor ID") of the sensor 14 that has outputted the sensor information to the processing unit 13, battery remaining amount information such as the battery voltage of the communication slave device 102 in which the processing unit 13 itself is included, and sensor management information such as LQI, and outputs the packet to the wireless circuit 12.

The wireless circuit 12 converts the packet received from the processing unit 13 into a wireless signal in accordance with the IEEE802.15.4 standard, for example, and transmits the resultant wireless signal from the antenna 11. Then, the base station 101 receives the wireless signal transmitted from the antenna 11 and performs a reception process of obtaining the sensor information, the sensor ID, the sensor management information, and the like from the received wireless signal. Then, the base station 101 transmits these obtained pieces of information to the management device 112.

(Configuration of Management Device)

Figure 3:
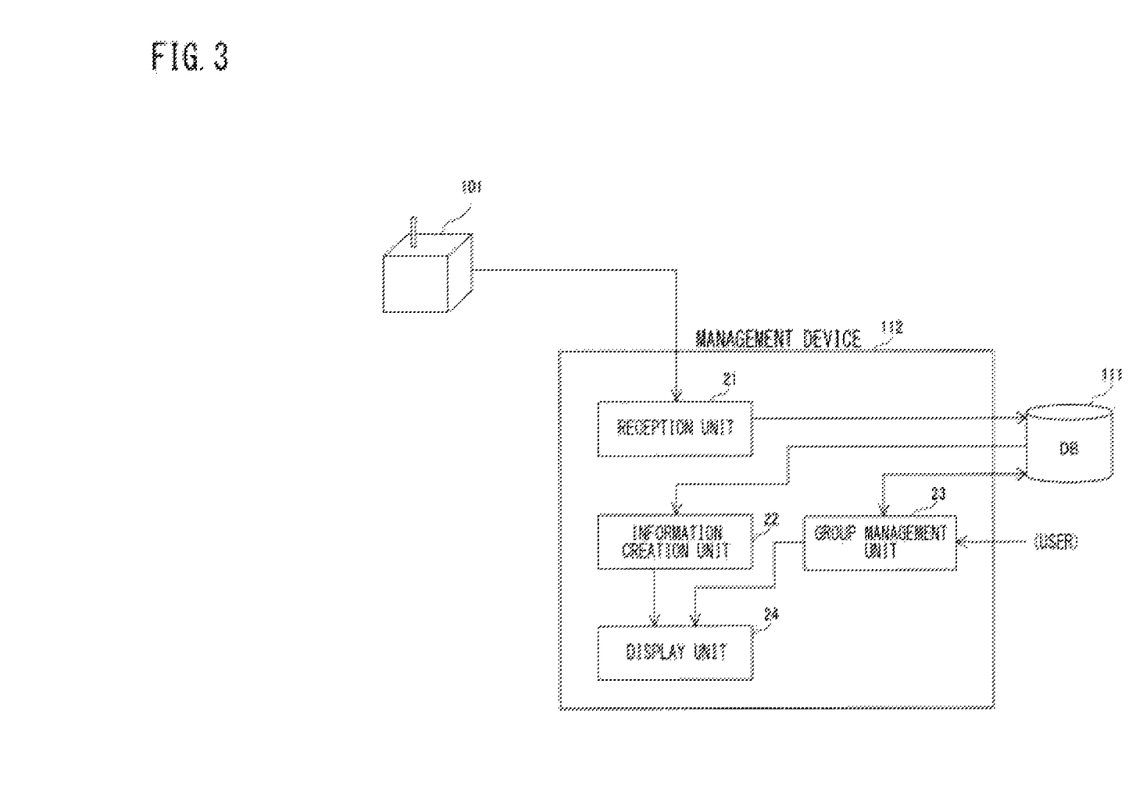
FIG. 3 shows a configuration of a management device in the management system according to the first embodiment of the present invention.

FIG. 3 shows a configuration of the management device in the management system according to the first embodiment of the present invention.

With reference to FIG. 3, the management device 112 includes a reception unit (obtainment unit) 21, an information creation unit 22, a group management unit 23, and a display unit 24.

The reception unit 21 obtains the sensor information, the sensor ID, and the sensor management information that have been transmitted from the base station 101. Then, the reception unit 21 transmits these obtained pieces of information to the accumulation device 111. Accordingly, in the accumulation device 111, these pieces of information are accumulated in association with one another.

The group management unit 23 performs a grouping process for dividing a plurality of the sensors 14 into a plurality of groups, by using sensor IDs accumulated in the accumulation device 111. Specifically, the group management unit 23 obtains a plurality of sensor IDs accumulated in the accumulation device 111, and outputs these obtained sensor IDs to the display unit 24. Then, the display unit 24 displays on the screen these sensor IDs received from the group management unit 23.

Then, the group management unit 23 receives an operation from a user for associating the sensor IDs with one another, the sensor IDs being displayed by the display unit 24, and divides a plurality of the sensors 14 into a plurality of groups on the basis of the received operation.

In addition, as a process for storing group information indicating the result of the grouping process, the group management unit 23 transmits the group information to the accumulation device 111. Accordingly, the group information is stored in the accumulation device 111.

The information creation unit 22 refers to the group information stored in the accumulation device 111, and with respect to target groups being at least a part of the plurality of groups, creates management information on the basis of the sensor information of each sensor 14 for each target group. For example, the information creation unit 22 obtains, from the accumulation device 111, sensor information from each of a plurality of the sensors 14 that belong to the same target group, and creates management information including a graph which would show temporal change in the each piece of the obtained sensor information.

The display unit 24 displays on the screen the management information received from the information creation unit 22. It should be noted that the information creation unit 22 and the display unit 24 may be provided outside the management device 112.

(Example of Grouping Process)

Figure 4:
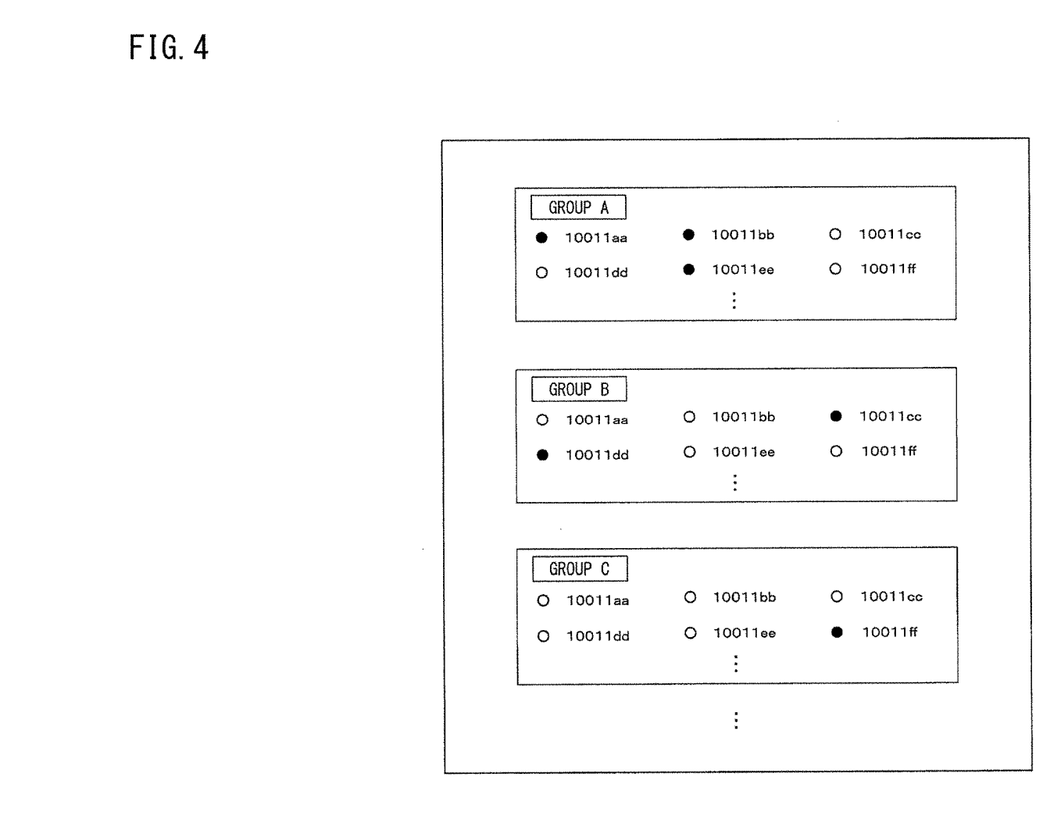
FIG. 4 illustrates one example of a grouping process performed by the management device shown in FIG. 3.

FIG. 4 illustrates one example of the grouping process performed by the management device shown in FIG. 3.

With reference to FIG. 4, the display unit 24 displays a screen that includes a plurality of display columns respectively indicating their corresponding groups, for example. In these display columns, the group names such as "Group A", "Group B", "Group C", and the like are respectively displayed. In addition, "10011aa", "10011bb", and the like which are respectively the sensor IDs accumulated in the accumulation device 111 are displayed.

The display unit 24 displays a screen that uses a GUI (graphical user interface), for example, and each sensor ID is provided with a selectable button. For each group, the user selects buttons on the screen by use of a mouse, a touch panel, or the like, thereby being able to determine sensors 14 that belong to the group. The user can also change the group name of each group.

In the example shown in FIG. 4, the user has made a selection such that "Group A" includes a sensor 14 whose sensor ID is "10011aa", a sensor 14 whose sensor ID is "10011bb", and a sensor 14 whose sensor ID is "10011ee", for example.

Upon receiving such an operation by the user, the group management unit 23 performs the grouping process of associating, for each group, the group name with the sensor IDs of the sensors 14 that belong to the group, for example. Then, as a result of the grouping process, the group management unit 23 transmits, to the accumulation device 111, group information in which the group name is associated with the sensor IDs.

It should be noted that the user performs grouping such that, for example, a plurality of the sensors 14 that are installed in the same area i.e., in the present embodiment, the plurality of the sensors 14 that are installed in the same container 161, will belong to the same group. Accordingly, the user can grasp the environment for each container 161, by confirming the management information for each group created by the information creation unit 22. In addition, the user can appropriately manage the management target stored in each container 161, by adjusting or the like the temperature in the container 161, or can grasp the correlation between a defect that has occurred in the management target and the environment of the container 161.

[Operation]

Next, the flow of operation performed by the management system according to the first embodiment of the present invention will be described with reference to the drawings.

Each device in the management system 301 includes a computer, and an arithmetic processing unit such as a CPU in the computer reads out a program including a part or the entirety of steps in the following sequence from a memory not shown, and executes the program. The programs for the plurality of devices can each be installed from outside. The programs for the plurality of devices are each distributed in a state of being stored in a storage medium.

Figure 5:
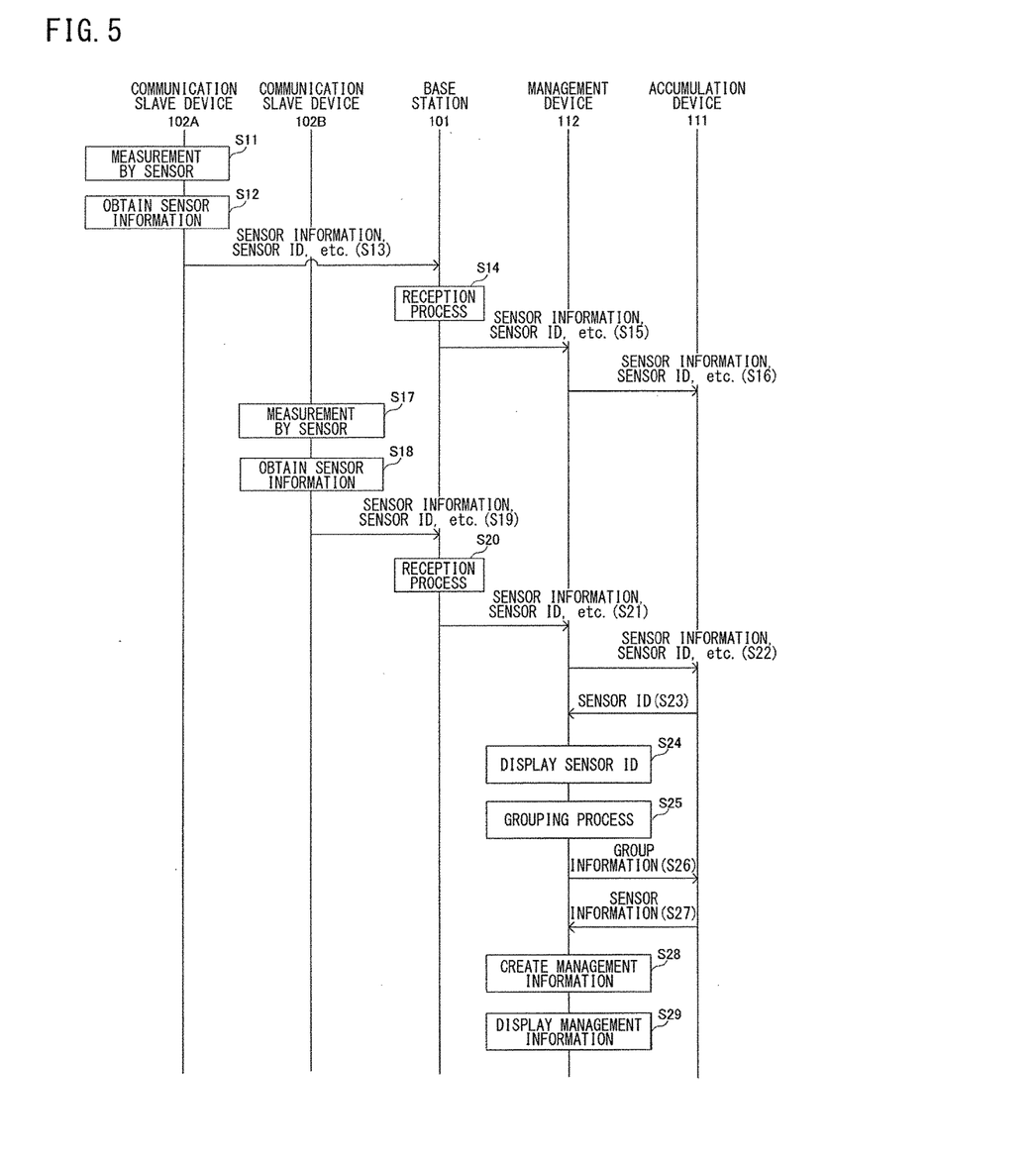
FIG. 5 is a sequence diagram showing the flow of operation performed by the management system according to the first embodiment of the present invention.

FIG. 5 is a sequence diagram showing the flow of operation performed by the management system according to the first embodiment of the present invention. Here, a case is shown in which two communication slave devices 102A and 102B and one base station 101 are provided in the management system 301.

With reference to FIG. 5, first, each sensor 14 of the communication slave device 102A performs measurement regarding the management target at a predetermined measurement timing, for example (step S11).

Next, the communication slave device 102A obtains sensor information indicating the result of the measurement performed by the sensor 14 (step S12), and causes the obtained sensor information, the sensor ID of the sensor 14, the sensor management information, and the like to be included in a wireless signal, and transmits the resultant wireless signal to the base station 101 (step S13).

Next, the base station 101 performs the reception process of receiving the wireless signal transmitted from the communication slave device 102A, and of obtaining the sensor information, the sensor ID, the sensor management information, and the like from the received wireless signal (step S14). Then, the base station 101 transmits these obtained pieces of information to the management device 112 (step S15).

Next, the management device 112 transmits the sensor information, the sensor ID, the sensor management information, and the like received from the base station 101, to the accumulation device 111 (step S16). Then, the accumulation device 111 accumulates these pieces of information received from the management device 112.

Next, also in the communication slave device 102B, each sensor 14 of the communication slave device 102B performs measurement regarding the management target at a predetermined measurement timing, for example (step S17).

Then, the communication slave device 102B obtains sensor information indicating the result of the measurement performed by the sensor 14 (step S18), and causes the obtained sensor information, the sensor ID of the sensor 14, the sensor management information, and the like to be included in a wireless signal, and transmits the resultant wireless signal to the base station 101 (step S19).

Next, the base station 101 performs the reception process of receiving the wireless signal transmitted from the communication slave device 102B, and of obtaining the sensor information, the sensor ID, the sensor management information, and the like from the received wireless signal (step S20). Then, the base station 101 transmits these obtained pieces of information to the management device 112 (step S21).

Next, the management device 112 transmits the sensor information, the sensor ID, the sensor management information, and the like received from the base station 101, to the accumulation device 111 (step S22). Then, the accumulation device 111 accumulates these pieces of information received from the management device 112.

Next, the management device 112 obtains the plurality of sensor IDs accumulated in the accumulation device 111 (step S23), and displays these obtained sensor IDs on the screen (step S24).

Next, the management device 112 receives an operation for grouping sensors 14 performed by the user, and performs a grouping process on the basis of the received operation (step S25). Then, the management device 112 transmits group information indicating the result of the grouping process, to the accumulation device 111 (step S26). Accordingly, the group information is stored in the accumulation device 111.

Next, the management device 112 refers to the group information accumulated in the accumulation device 111, and obtains sensor information of the sensors 14 for each group (step S27), and creates management information for each group on the basis of the obtained sensor information (step S28). Then, the management device 112 displays the created management information for each group, on the screen (step S29).

[Example of Management Information]

Figure 6:
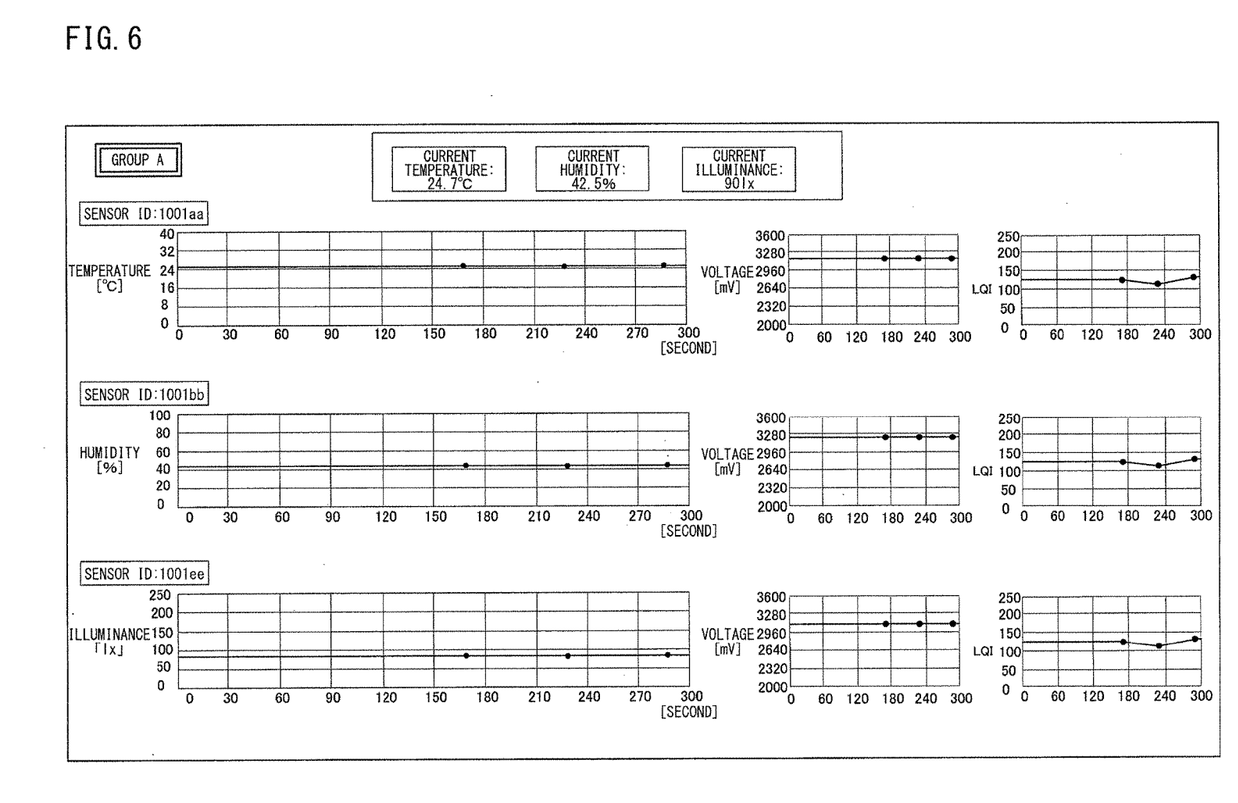
FIG. 6 illustrates one example of management information created by the management device in the management system according to the first embodiment of the present invention.

FIG. 6 illustrates one example of the management information created by the management device in the management system according to the first embodiment of the present invention.

Here, it is assumed that a sensor 14 whose sensor ID is "1001 as", a sensor 14 whose sensor ID is "1001bb", and a sensor 14 whose sensor ID is "1001ee" belong to "Group A". It is assumed that the sensor 14 whose sensor ID is "1001aa" measures the temperature, the sensor 14 whose sensor ID is "1001bb" measures the humidity, and the sensor 14 whose sensor ID is "1001ee" measures the illuminance.

In this case, with reference to FIG. 6, the management device 112 creates a graph indicating temporal change of the sensor information obtained by each sensor 14 included in "Group A", for example. Further, with respect to each sensor 14 included in "Group A", for example, the management device 112 creates a graph indicating temporal change of the voltage of its corresponding communication slave device 102, and a graph indicating temporal change of LQI of its corresponding communication slave device 102.

Then, the management device 112 displays these created graphs as the management information on the screen. Accordingly, by confirming the management information displayed on the screen, the user can comprehensively grasp the state of "Group A", on a single screen.

The management device 112 may create a comparison result of the sensor information between groups, as the management information. For example, the management device 112 may calculate the average temperature in a predetermined time period for each group, and may create a table or the like that indicates the calculation result and display the table or the like on the screen.

Meanwhile, in a management system in which: one or a plurality of communication slave devices that can wirelessly transmit measurement results regarding a management target are installed; measurement results obtained by sensors are collected at a base station via the communication slave devices; and the management target is managed on the basis of the collected measurement results, there is demand for a technology that provides more useful information for managing the management target.

In contrast, in the management device 112 according to the first embodiment of the present invention, the reception unit 21 receives the sensor ID and the sensor information indicating the measurement results, from a plurality of the sensors 14 that perform measurement regarding the management target. In addition, the group management unit 23 performs the grouping process of dividing a plurality of the sensors 14 into a plurality of groups by using the sensor IDs received by the reception unit 21, and performs the process of storing group information indicating the result of the grouping process.

Thus, by dividing a plurality of the sensors 14 into groups, it becomes possible to provide new information that has not been able to be provided on the basis of sensor 14-by-sensor 14 analysis, such as, for example, a collection of a plurality of pieces of sensor information for each group, and a comparison result of sensor information between groups. Therefore, in the management system 301 which allows measurement results obtained by the sensors 14 to be collected and the management target to be managed on the basis of the collected measurement results, it is possible to provide more useful information for managing the management target.

Meanwhile, for example, it is conceivable that a plurality of the sensors 14 are divided into groups by dividing the channels that are used in communication of sensor information. However, in this case, the base stations 101 for relaying communication between the sensors 14 and the management device 112 have to be installed by the number of the channels, which requires a large number of devices. In contrast, by dividing a plurality of the sensors 14 into groups by using identification information of each sensor 14 as described above, it is possible to divide the sensors 14 into groups while transmitting the sensor information from each sensor 14 to the management device 112 via one base station 101. Thus, it is not necessary to provide a large number of devices.

In the management device 112 according to the first embodiment of the present invention, the display unit 24 displays the sensor ID of each sensor 14 on the screen. Further, the group management unit 23 receives an operation performed by the user and for associating the sensor IDs displayed by the display unit 24 with one another, and performs the grouping process on the basis of the operation.

According to this configuration, it is possible to divide a plurality of the sensors 14 into groups, by the user performing an operation by use of a mouse, a touch panel, or the like onto the sensor IDs displayed on the screen, for example. Accordingly, it is possible to divide the sensors 14 into groups through a simple operation, and it is also possible to change the content of the grouping through a simple operation.

In the management device 112 according to the first embodiment of the present invention, with respect to target groups being at least a part of a plurality of groups, the information creation unit 22 creates management information for managing the management target, on the basis of the sensor information for each target group.

According to this configuration, by confirming the management information for each target group, it is possible to properly grasp the state of each target group, and to compare the states among a plurality of target groups. Accordingly, the management target can be more appropriately managed.

Next, another embodiment of the present invention will be described with reference to the drawings. In the drawings, the same or corresponding parts are denoted by the same reference signs, and description thereof is not repeated.

Second Embodiment

In the management system 301 according to a second embodiment of the present invention, the management device 112 controls, for each group, operation of the sensors 14 that are included in the management system 301. Here, the difference from the first embodiment described above will be mainly described.

[Basic Operation and Configuration]

Figure 7:
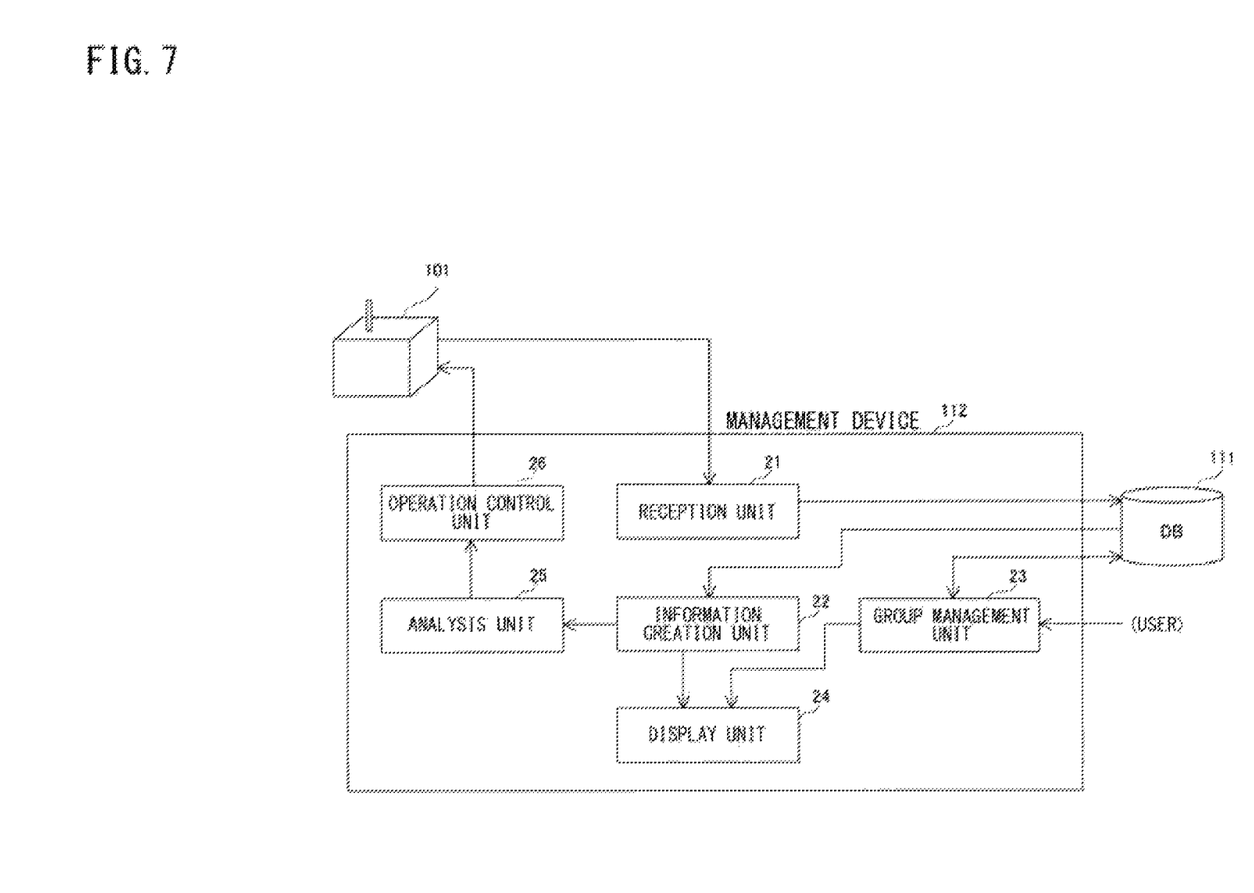
FIG. 7 shows a configuration of a management device in a management system according to a second embodiment of the present invention.

FIG. 7 shows a configuration of a management device in a management system according to the second embodiment of the present invention.

With reference to FIG. 7, the management device 112 in the management system 301 according to the second embodiment further includes an analysis unit 25 and an operation control unit 26, when compared with the management system 301 according to the first embodiment.

With respect to target groups being at least a part of the plurality of groups, the analysis unit 25 receives management information for each target group created by the information creation unit 22, performs analysis of each piece of management information, and outputs an analysis result to the operation control unit 26.

On the basis of the analysis result received from the analysis unit 25, the operation control unit 26 determines the presence/absence of a sensor 14 whose operation needs to be controlled. Then, when having determined that there is a sensor 14 whose operation needs to be controlled, the operation control unit 26 transmits control information for controlling the operation of the sensor 14, to the base station 101.

It should be noted that the management device 112 may not necessarily be provided with the analysis unit 25. For example, an administrator of the management system 301 may confirm the management information displayed on the screen, and information indicating an analysis result of the management information by the administrator may be provided to the operation control unit 26. Moreover, for example, the administrator may determine the presence/absence of a sensor 14 whose operation needs to be controlled, and a determination result by the administrator may be provided to the operation control unit 26.

[Operation]

Next, the flow of operation performed by the management system according to the second embodiment of the present invention will be described with reference to the drawings.

Figure 8:
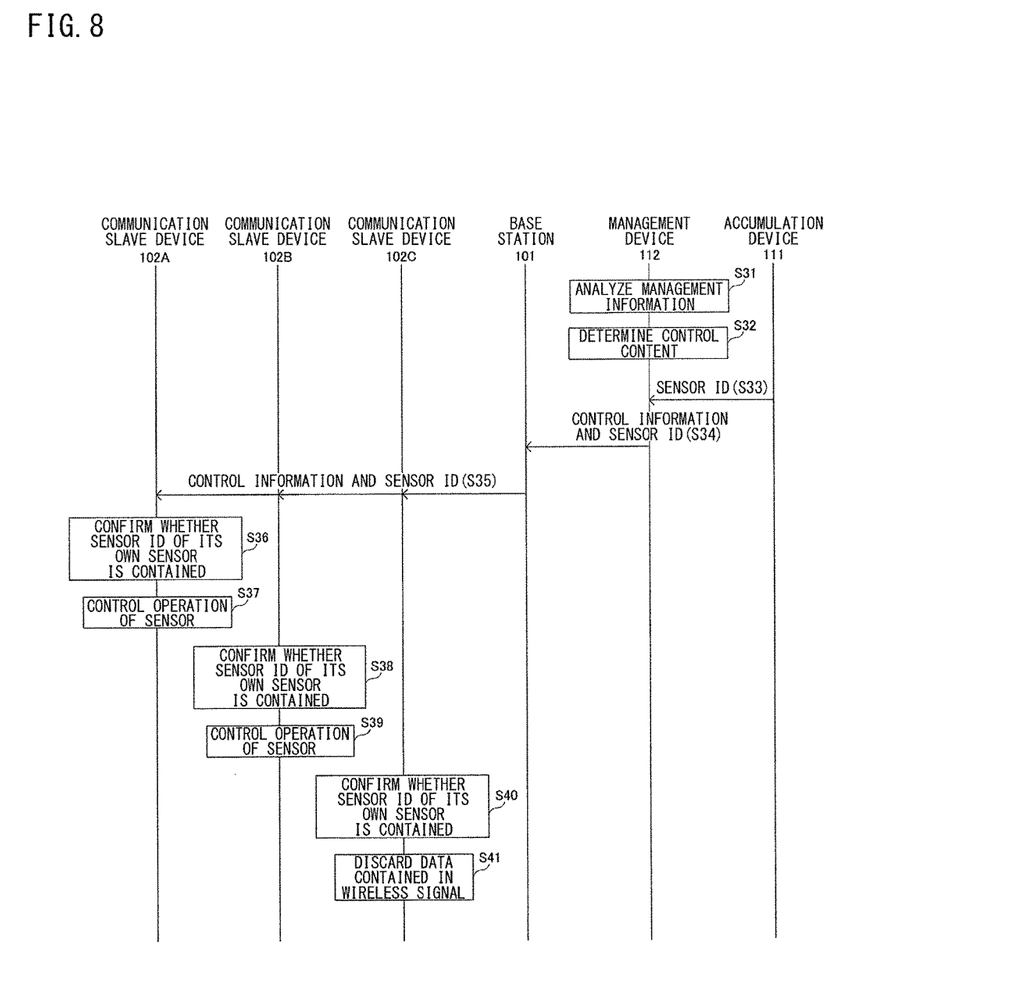
FIG. 8 is a sequence diagram showing the flow of operation performed by the management system according to the second embodiment of the present invention.

FIG. 8 is a sequence diagram showing the flow of operation performed by the management system according to the second embodiment of the present invention.

Here, a case is shown in which three communication slave devices 102A, 102B, and 102C and one base station 101 are provided in the management system 301. It is assumed that each sensor 14 of the communication slave device 102A and each sensor 14 of the communication slave device 102B are included in "Group A", and each sensor 14 of the communication slave device 102C is included in "Group B".

With reference to FIG. 8, first, the management device 112 performs analysis of management information for each target group created by the management device 112. For example, the management device 112 confirms whether the sensor information or the sensor management information included in the management information satisfies a predetermined condition (step S31).

Next, on the basis of the analysis result, the management device 112 determines the presence/absence of a sensor 14 whose operation needs to be controlled among the sensors 14 that are included in the management system 301, and when having determined that there is a sensor 14 whose operation needs to be controlled, determines a control content for the sensor 14 (step S32).

For example, when the LQIs of the communication slave devices 102 that correspond to the sensors 14 included in "Group A" are all lower than a predetermined threshold value, the management device 112 can estimate that there is a problem in the radio wave communication environment at the place where these communication slave devices 102 are installed.

Then, in such a case, the management device 112 determines that the operation of each sensor 14 included in "Group A" needs to be controlled, and for example, determines, as a control content, to shorten the transmission cycle of the sensor information from each of the sensors 14 than the current transmission cycle. It should be noted that the management device 112 may determine a specific numerical value of the transmission cycle, as the control content.

Next, with reference to the group information accumulated in the accumulation device 111, the management device 112 obtains the sensor ID of each sensor 14 included in "Group A", for example (step S33). Then, the management device 112 transmits, to the base station 101, control information indicating the determined control content, and the sensor ID of each sensor 14 included in "Group A" (step S34).

Next, upon receiving the control information and the sensor IDs from the management device 112, the base station 101 transmits, for example, through broadcast, a wireless signal that contains the control information and the sensor IDs, to the communication slave device 102A, the communication slave device 102B, and the communication slave device 102C (step S35).

Next, the communication slave device 102A confirms whether the sensor ID of the sensor 14 thereof is contained in the wireless signal received from the base station 101 (step S36). Here, as described above, the sensor 14 of the communication slave device 102A is included in "Group A", and thus, the wireless signal received from the base station 101 contains the sensor ID of the sensor 14 of the communication slave device 102A.

Next, since the sensor ID of the sensor 14 of the communication slave device 102A is contained in the wireless signal received from the base station 101, the communication slave device 102A controls the operation of the sensor 14 thereof in accordance with the control content indicated by the control information contained in the wireless signal. That is, the communication slave device 102A performs control of changing the output cycle of sensor information from the sensor 14 thereof, so as to have a value smaller than that of the current cycle, for example (step S37).

Next, similarly to the communication slave device 102A, the communication slave device 102B confirms whether the sensor ID of the sensor 14 thereof is contained in the wireless signal received from the base station 101 (step S38). Here, as described above, the sensor 14 of the communication slave device 102B is included in "Group A", and thus, the wireless signal received from the base station 101 contains the sensor ID of the sensor 14 of the communication slave device 102B.

Next, since the sensor ID of the sensor 14 of the communication slave device 102B is contained in the wireless signal received from the base station 101, the communication slave device 102B controls the operation of the sensor 14 thereof in accordance with the control content indicated by the control information contained in the wireless signal. That is, the communication slave device 102B performs control of changing the output cycle of sensor information from the sensor 14 thereof, so as to have a value smaller than that of the current cycle, for example (step S39).

Next, similarly to the communication slave devices 102A and 102B, the communication slave device 102C confirms whether the sensor ID of the sensor 14 thereof is contained in the wireless signal received from the base station 101 (step S40). Here, as described above, since the sensor 14 of the communication slave device 102C is included in "Group B", the wireless signal received from the base station 101 does not contain the sensor ID of the sensor 14 of the communication slave device 102C.

Next, since the sensor ID of the sensor 14 of the communication slave device 102C is not contained in the wireless signal received from the base station 101, the communication slave device 102C discards the data contained in the wireless signal, without confirming the control content indicated by the control information contained in the wireless signal, for example (step S41).

It is conceivable that when the transmission cycle of sensor information from the sensor 14 is shortened, the life of the battery of its corresponding communication slave device 102 is shortened. However, as described above, since the transmission cycle can be changed for only the sensors 14 in the target group for which it has been determined that the operation thereof needs to be controlled. Thus, increase in power consumption in the management system 301 can be suppressed.

In the example described above, a case has been described in which operation of each sensor 14 that belongs to one target group is controlled. However, the operation control unit 26 can also comprehensively control the operation of the sensors 14 of a plurality of target groups.

The other configuration and operation are the same as those in the management system 301 according to the first embodiment of the present invention described above, and thus, detailed description thereof is not repeated here.

As described above, in the management device 112 according to the second embodiment of the present invention, with respective to target groups being at least a part of a plurality of groups, the operation control unit 26 controls operation of the sensors 14, for each target group.

According to this configuration, since the operation of a plurality of the sensors 14 that belong to the same target group can be comprehensively controlled, efficient control can be realized.

In the management device 112 according to the second embodiment of the present invention, the operation control unit 26 controls, for each target group, the transmission cycle of sensor information from the sensor 14.

According to this configuration, in a case where the quality of communication from a plurality of the sensors 14 that belong to a certain target group is not sufficient, for example, it is possible to take appropriate measures in accordance with the communication state and the like for each target group, such as performing comprehensive control so that the transmission cycle of sensor information from each of the sensors 14 that belong to the target group is shortened.

The management system 301 according to the first embodiment and the second embodiment of the present invention is assumed to be used in a plant where the industrial materials 162 being the management target is present for each communication slave device 102, but the present invention is not limited thereto. For example, the management system 301 may be used for an application where a plurality of the sensors 14 respectively perform measurements with respect to a plurality of places, a plurality of measurement items, or the like of one management target.

It should be understood that the first embodiment and the second embodiment are merely illustrative and not restrictive in all aspects. The scope of the present invention is defined by the scope of the claims rather than the above description, and is intended to include meaning equivalent to the scope of the claims and all modifications within the scope.

The above description includes the features in the additional notes below.

[Additional Note 1]

A management device comprising:

an obtainment unit configured to obtain, from each of a plurality of sensors each configured to perform measurement regarding a management target, sensor information indicating a result of the measurement and identification information of the sensor; and a group management unit configured to perform a grouping process of dividing a plurality of the sensors into a plurality of groups by using the pieces of the identification information obtained by the obtainment unit, and to perform a process of storing group information indicating a result of the grouping process, wherein the grouping process is performed such that a plurality of the sensors installed in an identical area belong to an identical group.

[Additional Note 2]

A management system comprising:

a plurality of sensors each configured to perform measurement regarding a management target and to transmit sensor information indicating a result of the measurement and identification information of the sensor; and a management device configured to receive the sensor information and the identification information transmitted from each of the plurality of the sensors, to perform a grouping process of dividing a plurality of the sensors into a plurality of groups by using the received pieces of the identification information, and to perform a process of storing group information indicating a result of the grouping process, wherein the grouping process is performed such that a plurality of the sensors installed in an identical area belong to an identical group.

REFERENCE SIGNS LIST 11 antenna
12 wireless circuit
13 processing unit
14 sensor
15 semiconductor integrated circuit
21 reception unit (obtainment unit)
22 information creation unit
23 group management unit
24 display unit
25 analysis unit
26 operation control unit
101 base station
102, 102A, 102B, 102C communication slave device
111 accumulation device
112 management device
161 container
162 industrial material
301 management system

The invention claimed is:

1. A management device comprising:
a receiver to receive a packet from a base station receiving a wireless signal from a plurality of communication slave devices, the packet including sensor information indicating a measurement result and identification information of a sensor configured to perform measurement regarding a management target, the wireless signal including the sensor information and the identification information, the plurality of communication slave devices including corresponding sensors;
a display unit to display a graphical user interface (GUI) screen that includes a plurality of display columns for each group of the sensors, the plurality of display columns each displaying the identification information received by the network communicator, a selectable button, and a group name; and a processor to determine the sensor that belongs to each group based on a user's selection of the selectable button and to transmit, to an accumulation device accumulating the identification information and the group names, group information including the group names each associated with the identification information.

2. The management device according to claim 1, wherein the processor being to, with respect to target groups being at least a part of the plurality of the groups, create management information for managing the management target, on a basis of the sensor information for each target group.

3. The management device according to claim 1, wherein the processor being to, with respect to target groups being at least a part of the plurality of the groups, control operation of each sensor for each target group.

4. The management device according to claim 3, wherein the processor controls, for each target group, a transmission cycle of the sensor information from the sensor.

5. A management system comprising:

a plurality of communication slave devices each having a sensor that performs measurement regarding a management target and being to transmit a wireless signal that includes sensor information indicating a result of the measurement and identification information of the sensor;

a base station to receive the wireless signal from the communication slave devices and to transmit a packet that includes the sensor information and the identification information; and a management device to receive the packet transmitted from the base station, wherein the management device comprises a display unit to display a graphical user interface (GUI) screen that includes a plurality of display columns for each group of the sensors, the plurality of display columns each displaying the identification information received by the management device, a selectable button, and a group name, wherein the management device determines the sensor that belongs to each group based on a user's selection of the selectable button and transmits, to an accumulation device accumulating the identification information and the group names, group information including the group names each associated with the identification information.

6. A management method to be performed in a management device, the management method comprising the steps of:

receiving a packet from a base station receiving a wireless signal from a plurality of communication slave devices, the packet including sensor information indicating a measurement result and identification information of a sensor configured to perform measurement regarding a management target, the wireless signal including the sensor information and the identification information, the plurality of communication slave devices including corresponding sensors;

displaying a graphical user interface (GUI) screen that includes a plurality of display columns for each group of the sensors, the plurality of display columns each displaying the identification information received by the management device, a selectable button, and a group name;

determining the sensor that belongs to each group based on user's selection of the selectable button; and transmitting, to an accumulation device accumulating the identification information and the group names, group information including the group names each associated with the identification information.

7. A non-transitory computer readable storage medium storing a management program to be used in a management device, the management program being executed by a processor to cause a computer to execute the steps of:

receiving a packet from a base station receiving a wireless signal from a plurality of communication slave devices, the packet including sensor information indicating a measurement result and identification information of a sensor configured to perform measurement regarding a management target, the wireless signal including the sensor information and the identification information, the plurality of communication slave devices including corresponding sensors;

displaying a graphical user interface (GUI) screen that includes a plurality of display columns for each group of the sensors, the plurality of display columns each displaying the identification information received by the management device, a selectable button, and a group name;

determining the sensor that belongs to each group based on user's selection of the selectable button; and transmitting, to an accumulation device accumulating the identification information and the group names, group information including the group names each associated with the identification information.

* * * * *